United States Patent
Krivokapic

(10) Patent No.: US 11,343,008 B2
(45) Date of Patent: May 24, 2022

(54) EXTENDED SPECTRUM TDMA SIGNAL SWITCHING CABLE TAP BOX

(71) Applicant: Pulselink, Inc, Carlsbad, CA (US)

(72) Inventor: Ivan Krivokapic, San Diego, CA (US)

(73) Assignee: Pulselink, Inc.

( * ) Notice: Subject to any disclaimer, the term of this patent is extended or adjusted under 35 U.S.C. 154(b) by 0 days.

(21) Appl. No.: 16/983,710

(22) Filed: Aug. 3, 2020

(65) Prior Publication Data

US 2021/0036795 A1 Feb. 4, 2021

Related U.S. Application Data

(60) Provisional application No. 62/882,003, filed on Aug. 2, 2019.

(51) Int. Cl.

| | | |
|---|---|---|
| *H04J 3/08* | (2006.01) | |
| *H04L 12/28* | (2006.01) | |
| *H04L 49/201* | (2022.01) | |
| *H04J 3/16* | (2006.01) | |

(52) U.S. Cl.
CPC ............. *H04J 3/08* (2013.01); *H04J 3/1694* (2013.01); *H04L 12/2861* (2013.01); *H04L 49/201* (2013.01)

(58) Field of Classification Search
CPC ....... H04J 3/08; H04J 3/1694; H04L 12/2861; H04L 49/201
See application file for complete search history.

(56) References Cited

U.S. PATENT DOCUMENTS

| | | | |
|---|---|---|---|
| 2012/0044361 A1* | 2/2012 | Riggsby ................. | H04N 7/104 348/192 |
| 2019/0081661 A1* | 3/2019 | Krapp .................... | H04L 5/1461 |
| 2020/0251835 A1* | 8/2020 | Finkelstein .......... | H04B 17/318 |

* cited by examiner

*Primary Examiner* — Samina F Choudhry
(74) *Attorney, Agent, or Firm* — The Belles Group, P.C.

(57) ABSTRACT

A method of proprietary TDMA (Time-Division Multiple Access) data modulated signals nonlinear signal splitting (switching) system is disclosed. Said TDMA system operates over distribution CATV infrastructure and in ES (extended spectrum) that is usually allocated above in the frequency band comparing to one defined in the CATV DOCSIS standard. Said system is meant to increase data throughput capacity over existing CATV based systems targeting primarily ES (Extended Spectrum band) by means of TDMA approach. The purpose of the RF switches based tap box is to connect specific device to which TDMA packet is relayed to. This approach reduces excessive losses that are present in standard tap boxes by disconnecting other devices, which are not receiving or sending related TDMA data packets. The described method introduces switch control receiver concept that allows for configuration of various operation modes such as regular switched TDMA, amplified and broadcast modes.

2 Claims, 3 Drawing Sheets

EXTENDED SPECTRUM TDMA SIGNAL SWITCHING CABLE TAP BOX

CROSS REFERENCE TO RELATED APPLICATIONS

The present application claims the benefit of U.S. Provisional Patent Application No. 62/882,003 filed on Aug. 2, 2019, which is incorporated herein by reference.

BACKGROUND

Prior art considers CATV taps used to connect drop cables to the distribution cable and trough the same cables to the final user. The standard tap box introduces a much higher signal loss to drop cables than is seen in its transmission path along the distribution cable. Described attenuation appears due to the fact that multiple users are connected to the distribution line at the same time that causes additional splitting losses.

BRIEF SUMMARY

This invention relates to the field of proprietary TDMA (Time-Division Multiple Access) data modulated signal nonlinear splitting (switching) system that operates over distribution CATV infrastructure in ES (extended spectrum). ES is usually allocated above the frequency band defined in DOCSIS and similar standards.

A method of proprietary TDMA data modulated signals nonlinear signal splitting (switching) system is disclosed. Said TDMA system operates over distribution CATV infrastructure and in ES (extended spectrum) that is usually allocated above in the frequency band comparing to one defined in the CATV DOCSIS standard. Said system is meant to increase data throughput capacity over existing CATV based systems targeting primarily ES (Extended Spectrum band) by means of TDMA approach. The purpose of the RF switches based tap box is to connect specific device to which TDMA packet is relayed to. This approach reduces excessive losses that are present in standard tap boxes by disconnecting other devices, which are not receiving or sending related TDMA data packets. The described method introduces switch control receiver concept that allows for configuration of various operation modes such as regular switched TDMA, amplified and broadcast modes. The system also provides for enhanced security, by individually and only connecting data to a single user at a time.

BRIEF DESCRIPTION OF THE DRAWINGS

The present disclosure will become more fully understood from the detailed description and the accompanying drawings, wherein.

DETAILED DESCRIPTION

Figure 1:
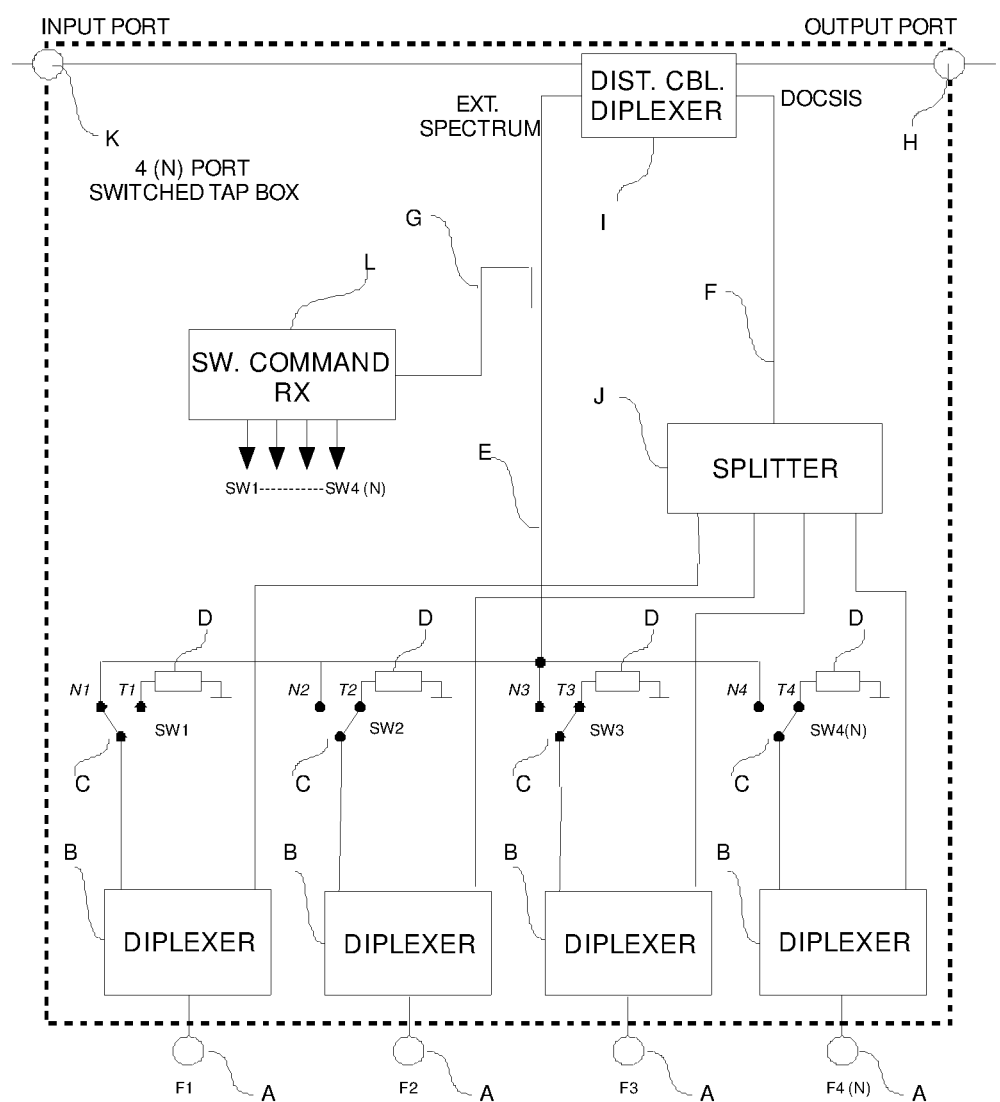
FIG. 1 is a block diagram of an extended spectrum TDMA signal switching cable tap box according to one embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, where circuits are shown and described, one of skill in the art will recognize that, for the sake of clarity, not all peripheral circuits or components are shown in the figures or described in the description. Further, the terms "couple" and "operably couple" can refer to a direct or indirect coupling of two components of a circuit.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

This invention relates to the proprietary TDMA transmit/receive system that operates in CATV infrastructure environment, and which is designed to increase data throughput capacity over the ES (Extended Spectrum band).

Purpose of the RF switches based tap box is to connect specific device to which TDMA packet is relayed to. This approach prevents losses that are present in standard tap boxes by disconnecting other devices that are not receiving or sending related TDMA data packets. Reduced losses of described switching approach are improving CNR (Carrier to Noise Ratio) to the both Master/Slave modems. Consequently, described approach leads to data throughput enhancement by the means of CNR improvement.

FIG. 1 depicts a block diagram of an ES TDMA Signal Switch Cable Tap Box. Tap box incorporates (I) Distribution cable ES/DOCSIS diplexer that purpose is to isolate CATV and DOCSIS signals and extended spectrum in which TDMA system operates. Additionally, diplexer must provide sufficient isolation between ES and DOCSIS allocated operating frequencies. Proper packet routing is assured by (L) Switch signal receiver utilization. After (L) receives encoded command from the Master modem, (L) turns appropriate (C) RF switch from state T in which switch is connected to (D) Termination resistance to position "N". Further, signal is routed through appropriate (B) diplexer to (A) drop cable port. By this means, connection between Master and desired Slave modem is established. The switch command receiver is coupled by (G) directional coupler to (E) ES signal line. Switch commands to the (L) receiver could be sent by mean of separate RF channel or variety of other means.

On the other side, though the (I) distribution line diplexer, DOCSIS band is provided in standard way through (F), (J) Splitter, (B) Drop cable diplexers to (A) Drop cable connectors.

Figure 2:
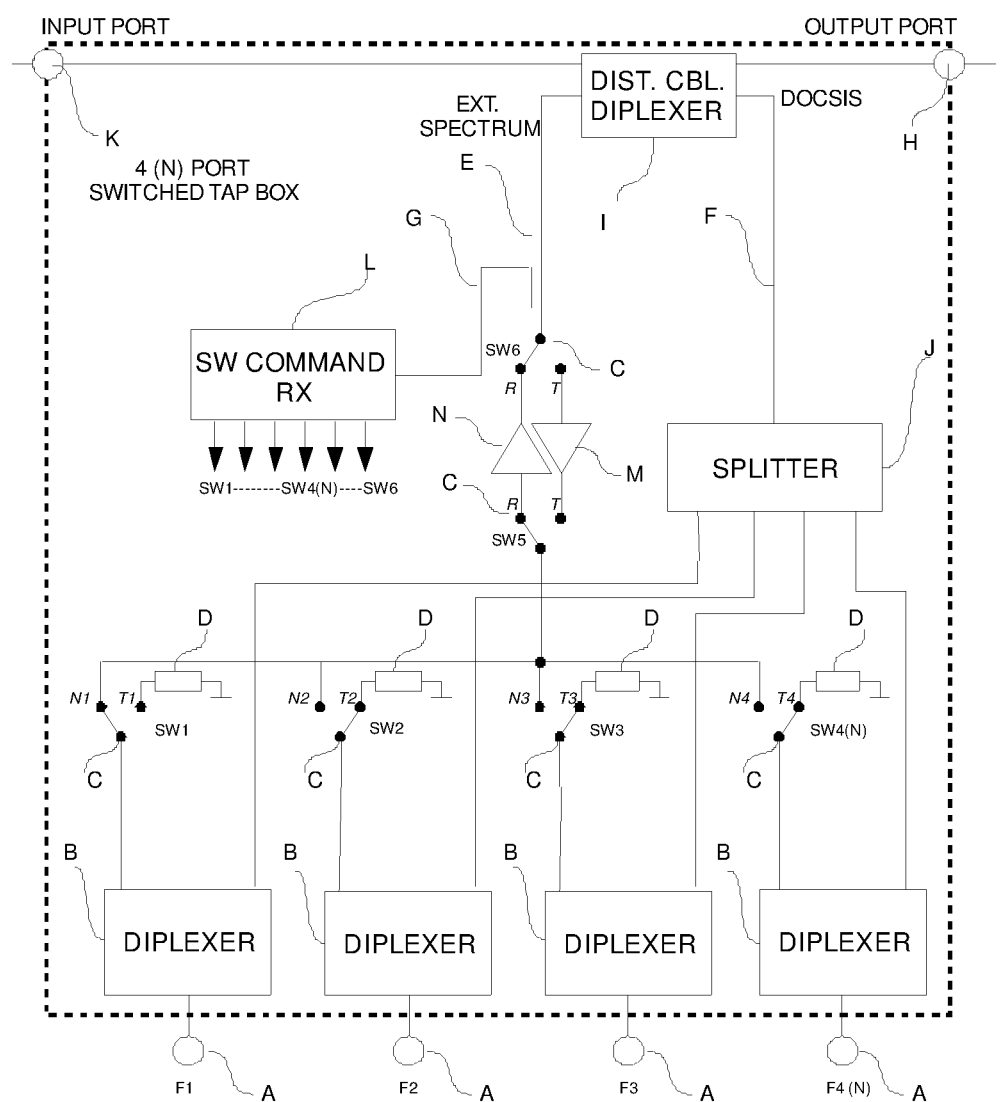
FIG. 2 is a block diagram of an extended spectrum TDMA signal switching cable tap box with ES upstream/downstream amplification according to one embodiment.

The FIG. 2 depicts operation of similar embodiment to one shown on the FIG. 1 with exception of presence of the switching bidirectional amplifier. Namely, in some cases amplification of the signal is needed to make up for excessive cable losses and thus assure highest possible data throughput. This embodiment includes two additional absorptive RF switches SW5 and SW6. Namely, sw. command receiver establishes upstream—position "R" or downstream—position "T" amplification direction. Neutral RF switches SW5, SW6 position when both amplifiers are disconnected and yet another one in which switch SW5 and SW6 are bridging amplifiers, are representing other flavors of this embodiment not shown on the FIG. 2.

Figure 3:
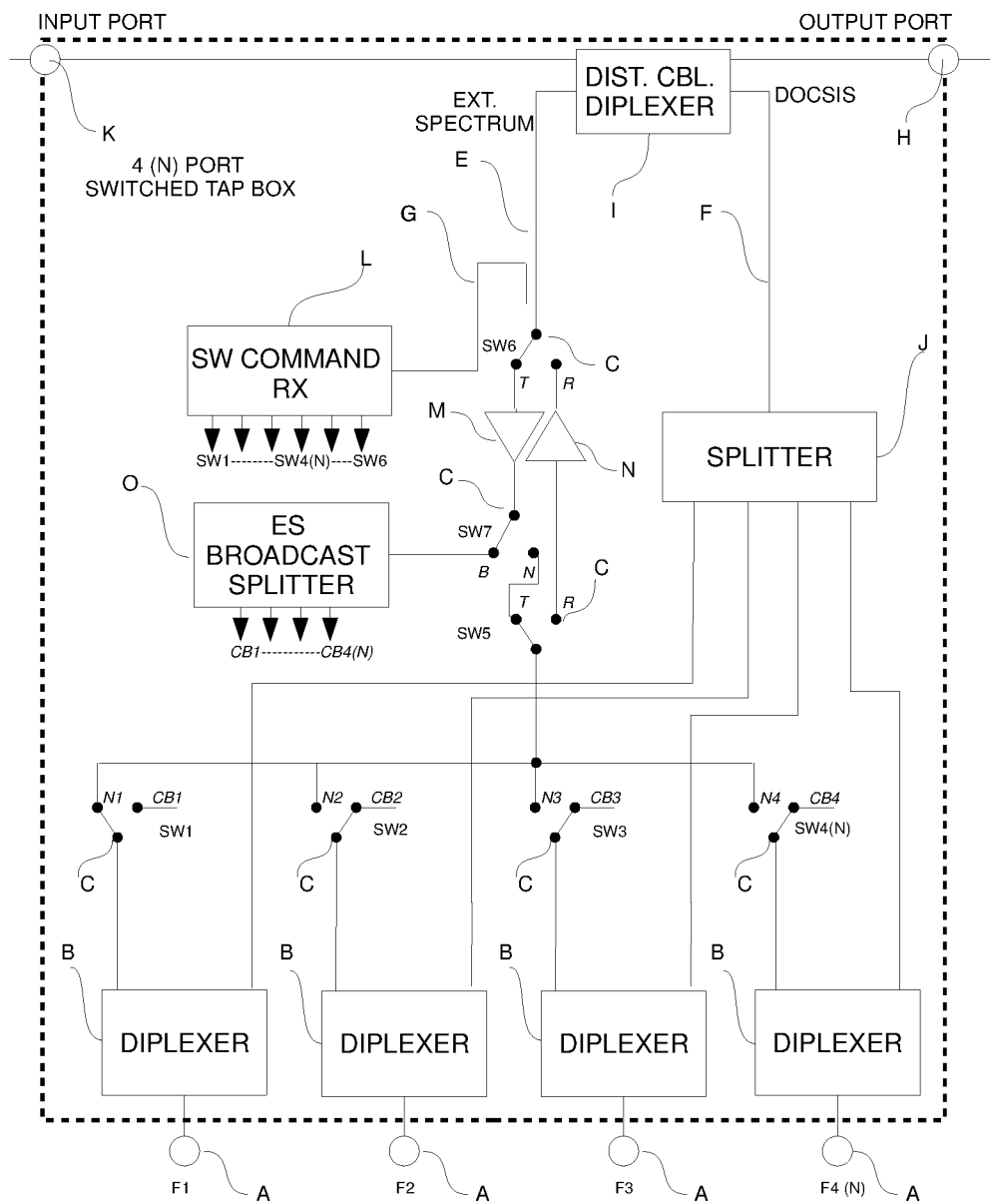
FIG. 3 is a block diagram of an extended spectrum TDMA signal switching cable tap box with ES upstream/downstream amplification and ES broadcast mode according to one embodiment.

The FIG. 3 depicts operation of similar embodiment to one on the FIG. 2 with exception of presence of the ES (O) broadcast mode splitter. Namely, in some TDMA application Master modem must send broadcast mode packets. In this case all Slave modems must to receive these at the same time. For this case another switch (C) SW7 is introduced. This RF switch is controlled by (L) like others. For normal mode of operation this switch should be in position "N". For broadcast mode the same switch must be in position "B". When SW7 is placed to the broadcast mode received and amplified signal is passed through the (O) to other (C) SW1-SW4 side of the switch that was connected to termination resistor in embodiments shown on the FIGS. 1 and 2. Further, when in broadcast mode SW1-SW4 are switched from N1-N4 (normal mode) to CB1-CB4 (broadcast mode). Additional losses in broadcast (beacon) mode are not that relevant, since this signal usually requires lower CNR.

Figure 4:
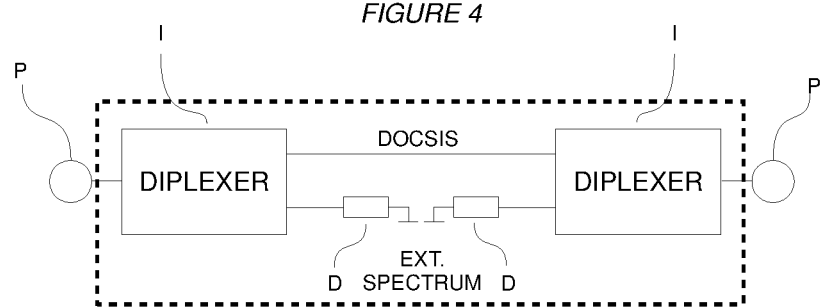
FIG. 4 is an extended spectrum signal cable termination box according to one embodiment.

In order to isolate unrelated adjacent TDMA network on the distribution cable and thus prevent packet collision, it is necessary to introduce ES signal trap, which structure is presented in FIG. 4. As one can see, DOCSIS signal passes without obstruction through the (I) diplexer and ES signal is terminated by (D). ES trap is meant to be installed on the distribution cable side of the CATV.

Although FIGS. 1-3 are depicting 4 ways splitter, the number of (A) drop connections could be increased or decreased, along with adapting corresponding design as needed.

FIGURES KEY

FIG. 1: Extended Spectrum TDMA Signal Switching Cable Tap Box—Block Diagram

A—Drop-off Cable Connector Ports; B—ES/DOCSIS Diplexer; C—Absorptive RF SPDT Switch; D—Characteristic impedance termination; E—Extended Spectrum signal line; F—DOCSIS signal line; G—Directional coupler; H—Distribution cable output port; I—Distribution cable ES/DOCSIS Diplexer; J—DOCSIS signal splitter; K—Distribution cable input port; L—Switch (commutation) command receiver FIG. 2: Extended Spectrum TDMA Signal Switching Cable Tap Box with ES Upstream/Downstream Amplification—Block Diagram A—Drop-off Cable Connector Ports; B—ES/DOCSIS Diplexer; C—Absorptive RF SPDT Switch; D—Characteristic impedance termination; E—Extended Spectrum signal line; F—DOCSIS signal line; G—Directional coupler; H—Distribution cable output port; I—Distribution cable ES/DOCSIS Diplexer; J—DOCSIS signal splitter; K—Distribution cable input port; L—Switch (commutation) command receiver; N—ES Upstream amplifier; M—ES Downstream amplifier FIG. 3: Extended Spectrum TDMA Signal Switching Cable Tap Box with ES Upstream/Downstream Amplification and ES Broadcast Mode—Block Diagram A—Drop-off Cable Connector Ports; B—ES/DOCSIS Diplexer; C—Absorptive RF SPDT Switch; D—Characteristic impedance termination; E—Extended Spectrum signal line; F—DOCSIS signal line; G—Directional coupler; H—Distribution cable output port; I—Distribution cable ES/DOCSIS Diplexer; J—DOCSIS signal splitter; K—Distribution cable input port; L—Switch (commutation) command receiver; N—ES Upstream amplifier; M—ES Downstream amplifier; O—ES Broadcast Splitter FIG. 4: Extended Spectrum Signal Cable Termination Box P—Input/output distribution cable ports; D—Characteristic impedance termination; I—Distribution cable ES/DOCSIS Diplexer Broadly understood, the inventions disclosed herein may include:

ES TDMA Signal Switch Cable Tap Box allowing distribution of the TDMA signals with reduced insertion losses and allowing for DOCSIS signals to be distributed independently in a standard way.

ES TDMA Signal Switch Cable Tap Box that incorporates bidirectional amplifier that supports TDMA operation and allows for coexistence of DOCSIS channels.

TDMA packet routing is assured by Switch Signal Receiver that receives signal from the Master modem and manages RF switches states. Switch commands to the receiver could be sent by the mean of separate RF channel or variety of other means.

ES TDMA Signal Switch Cable Tap Box allowing for distribution of the amplified TDMA signals and allowing for DOCSIS signals to be distributed independently in a standard way.

ES TDMA Signal Switch Cable Tap Box allowing for distribution of the amplified TDMA signals and supports TDMA broadcast mode. This embodiment allows for DOCSIS signals to be distributed independently in a standard way.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A cable tap comprising:
   an input port;
   an output port;
   tap ports operably coupled to the input and output ports;
   tap port switches comprising a tap port switch corresponding to each of the tap ports, each tap port switch configured to switch in and out its corresponding tap port; and
   a switch command receiver configured to:
      based on a first received command from a master modem, cause activation of a normal mode; and
      based on a second received command from a master modem, cause activation of a broadcast mode;
   wherein in the normal mode the tap port switches are switched such that data is routed to only a single one of the tap ports; and
   wherein in the broadcast mode the tap port switches are switched such that data is routed simultaneously to all of the tap ports.

2. The cable tap of claim 1 further comprising an upstream amplifier and a downstream amplifier to regulate upstream and downstream communications.

* * * * *